United States Patent
Kawahata et al.

(10) Patent No.: US 11,611,361 B2
(45) Date of Patent: Mar. 21, 2023

(54) COMMUNICATION MODULE

(71) Applicant: Murata Manufacturing Co., Ltd., Kyoto (JP)

(72) Inventors: Kazunari Kawahata, Kyoto (JP); Ryuken Mizunuma, Kyoto (JP); Hideki Ueda, Kyoto (JP); Satoshi Tanaka, Kyoto (JP); Masashi Omuro, Kyoto (JP); Yasuhisa Yamamoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 211 days.

(21) Appl. No.: 17/032,345

(22) Filed: Sep. 25, 2020

(65) Prior Publication Data
US 2021/0105030 A1  Apr. 8, 2021

(30) Foreign Application Priority Data

Oct. 2, 2019 (JP) .............................. JP2019-182341

(51) Int. Cl.
*H04B 1/04* (2006.01)
*H01Q 1/48* (2006.01)

(52) U.S. Cl.
CPC ............. *H04B 1/0475* (2013.01); *H01Q 1/48* (2013.01)

(58) Field of Classification Search
CPC ................. H04B 1/0475; H01Q 1/48
See application file for complete search history.

(56) References Cited

U.S. PATENT DOCUMENTS

| | | | |
|---|---|---|---|
| 2011/0038401 A1* | 2/2011 | Demuynck | H04B 1/38 375/222 |
| 2017/0250120 A1 | 8/2017 | Harauchi et al. | |
| 2018/0159203 A1* | 6/2018 | Baks | H01Q 1/48 |
| 2019/0334233 A1* | 10/2019 | Kim | H01Q 21/28 |
| 2020/0395681 A1* | 12/2020 | Ueda | H01Q 23/00 |
| 2021/0058800 A1* | 2/2021 | Ch | H01Q 1/243 |

FOREIGN PATENT DOCUMENTS

JP    6400108 B2    10/2018

* cited by examiner

*Primary Examiner* — Junpeng Chen
(74) *Attorney, Agent, or Firm* — Pearne & Gordon LLP

(57) ABSTRACT

A feed line connects an RFIC and a radiating element. A baseband ground plane (BB ground) is connected to a ground terminal of a BBIC. A radio frequency ground plane (RF ground) is placed in such a manner as to overlap the BB ground. The RF ground serves as a return path of the feed line. A first inter-ground connection circuit connects the BB ground and the RF ground. Furthermore, a second inter-ground connection circuit connects the BB ground and the RF ground. Connecting parts between these grounds and the second inter-ground connection circuit are arranged closer to the edges of these grounds than connecting parts between these grounds and the first inter-ground connection circuit. The connecting part between the ground and the second inter-ground connection circuit is placed on one side of a certain imaginary straight line that passes substantially the geometric center of the ground.

22 Claims, 13 Drawing Sheets

COMMUNICATION MODULE

This application claims priority from Japanese Patent Application No. 2019-182341 filed on Oct. 2, 2019. The content of this application is incorporated herein by reference in its entirety.

BACKGROUND OF THE DISCLOSURE

Field of the Disclosure

The present disclosure relates to a communication module in which a radiating element, a radio frequency integrated circuit element and a baseband integrated circuit element are unified.

Description of the Related Art

A radio frequency module of antenna unified type, in which an antenna and a radio frequency integrated circuit element are unified, is known in the art (for example, Japanese Patent No. 6400108). In this radio frequency module, heat from a power amplifier of the radio frequency integrated circuit element is dissipated from not only a heat sink but also an antenna element. To dissipate heat from a radiation plane of the antenna element, a zero-point of electric field intensity of the antenna element is connected to a ground layer. An input signal and a control signal are inputted from a circuit that performs the processing of a baseband signal to the radio frequency integrated circuit element via an input connector.

BRIEF SUMMARY OF THE DISCLOSURE

In the case where a radio frequency module is unified with a baseband signal processing circuit that performs high speed sampling, as typified by the fifth generation (5G) mobile communication system, a radio frequency ground and a baseband ground are likely to be coupled, and spurious emissions caused by digital noise or the like are likely to be generated from the radio frequency ground.

An object of the present disclosure is to provide a communication module capable of suppressing emissions of noise even in the case where the baseband ground and the radio frequency ground are coupled.

According to one aspect of the present disclosure, there is provided a communication module including: a baseband integrated circuit element that performs processing of a baseband signal; a radio frequency integrated circuit element that performs processing of a radio frequency signal based on a control signal and a low frequency signal supplied from the baseband integrated circuit element; a radiating element; a feed line that connects the radio frequency integrated circuit element and the radiating element; a baseband ground plane connected to a ground terminal of the baseband integrated circuit element; a radio frequency ground plane placed in such a manner as to overlap the baseband ground plane, the radio frequency ground plane serving as a return path of the feed line; a first inter-ground connection circuit that connects the baseband ground plane and the radio frequency ground plane; and at least one second inter-ground connection circuit that connects the baseband ground plane and the radio frequency ground plane, wherein a connecting part between the baseband ground plane and the second inter-ground connection circuit and a connecting part between the radio frequency ground plane and the second inter-ground connection circuit are arranged closer to respective edges of the baseband ground plane and the radio frequency ground plane than a connecting part between the baseband ground plane and the first inter-ground connection circuit and a connecting part between the radio frequency ground plane and the first inter-ground connection circuit, and the connecting part between the baseband ground plane and the second inter-ground connection circuit and the connecting part between the radio frequency ground plane and the second inter-ground connection circuit are arranged on one side of a certain imaginary straight line that passes a geometric center of the baseband ground plane and one side of a certain imaginary straight line that passes a geometric center of the radio frequency ground plane, respectively.

According to another aspect of the present disclosure, there is provided a communication module including: a baseband integrated circuit element that performs processing of a baseband signal; a radio frequency integrated circuit element that performs processing of a radio frequency signal based on a control signal and a low frequency signal supplied from the baseband integrated circuit element; a radiating element; a feed line that connects the radio frequency integrated circuit element and the radiating element; a baseband ground plane connected to a ground terminal of the baseband integrated circuit element; a radio frequency ground plane placed in such a manner as to overlap the baseband ground plane, the radio frequency ground plane serving as a return path of the feed line; a first inter-ground connection circuit that connects the baseband ground plane and the radio frequency ground plane; a baseband ground terminal that connects the baseband ground plane to a land of an external board; a radio frequency ground terminal; and a second inter-ground connection circuit that connects the radio frequency ground plane and the radio frequency ground terminal, wherein a connecting part between the radio frequency ground plane and the second inter-ground connection circuit is placed closer to an edge of the radio frequency ground plane than a connecting part between the radio frequency ground plane and the first inter-ground connection circuit, and the connecting part between the radio frequency ground plane and the second inter-ground connection circuit is placed on one side of a certain imaginary straight line that passes a geometric center of the radio frequency ground plane.

It becomes possible to mutually weaken spurious emissions caused by noise currents generated in the baseband ground plane and the radio frequency ground plane by providing the second inter-ground connection circuit in addition to the first inter-ground connection circuit in between the baseband ground plane and the radio frequency ground plane. This enables to suppress the spurious emissions.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

First Working Example

Figure 1A:
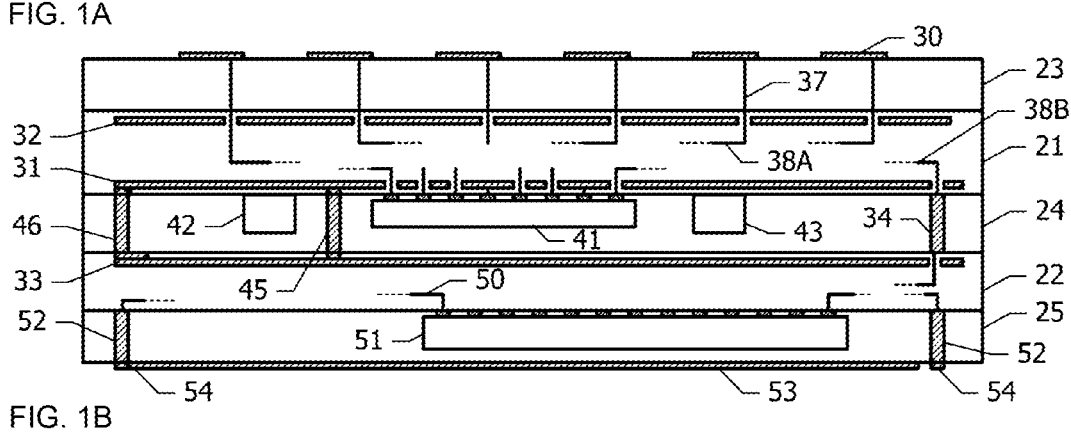
FIG. 1A is a cross-sectional view of a communication module according to a first working example.

Referring to the drawings from FIG. 1A to FIG. 6C, a communication module according to the first working example is described.

Figure 1B:
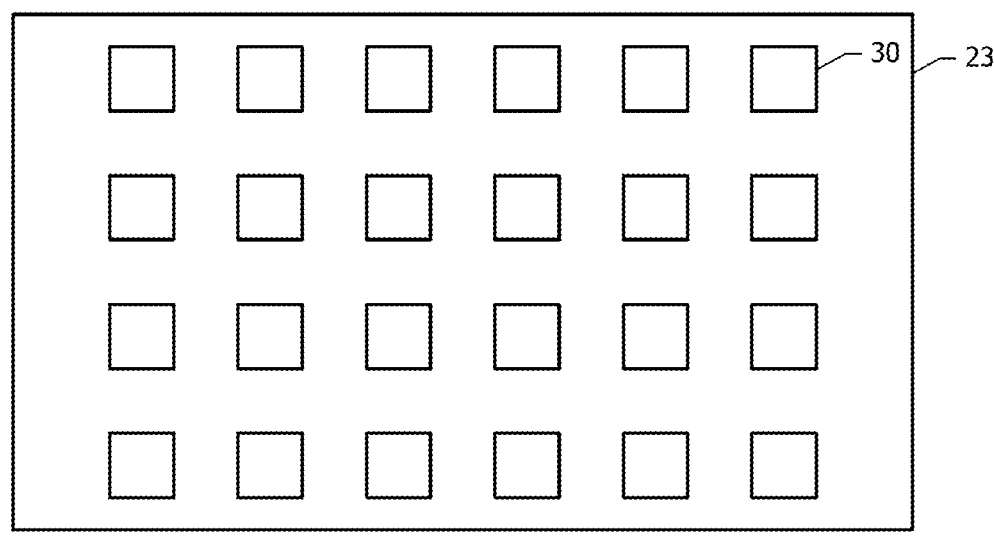
FIG. 1B is a plan view of the communication module according to the first working example.
Figure 1C:
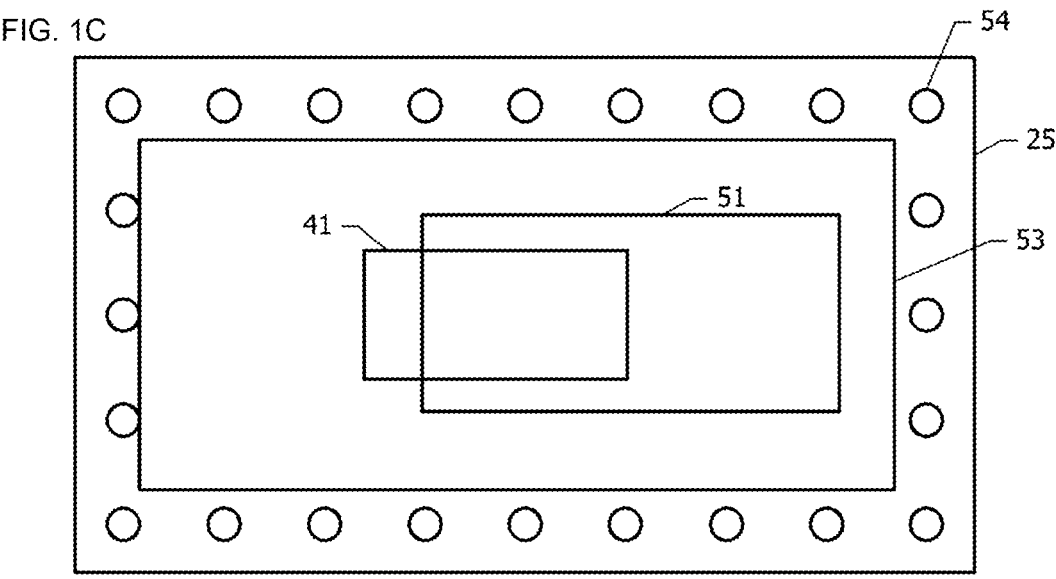
FIG. 1C is a diagram illustrating a planar spatial relationship among a radio frequency integrated circuit element, a baseband integrated circuit element, and conductor posts mounted on the communication module according to the first working example.

FIG. 1A is a cross-sectional view of a communication module according to a first working example. FIG. 1B is a plan view of the communication module according to the first working example. FIG. 1C is a diagram illustrating a planar spatial relationship among a radio frequency integrated circuit element, a baseband integrated circuit element, and conductor posts mounted on the communication module according to the first working example.

The communication module according to the first working example has a multilayer structure in which a sealing resin layer 25, a multilayer substrate 22, a sealing resin layer 24, a multilayer substrate 21, and a multilayer substrate 23 are stacked on top of each other in this order. The direction from the sealing resin layer 25 to the multilayer substrate 23 is defined as the upward direction, and its opposite direction is defined as the downward direction. For example, as the multilayer substrates 21, 22, and 23, a low temperature cofired ceramic (LTCC) substrate, a resin substrate, or the like can be used.

A radio frequency integrated circuit element 41 and radio frequency circuit components 42 and 43 are mounted on a downward surface of the multilayer substrate 21. A plurality of feed lines 38A and a plurality of wiring lines 38B are arranged inside the multilayer substrate 21. For example, as the feed line 38A, a strip line having a tri-plate structure is used. The radio frequency integrated circuit element 41 and the radio frequency circuit components 42 and 43 are sealed by the sealing resin layer 24. A plurality of conductor posts 34 is buried in the sealing resin layer 24. The plurality of conductor posts 34 each extend from the downward surface of the multilayer substrate 21 and reach a boundary between the sealing resin layer 24 and the multilayer substrate 22.

A baseband integrated circuit element 51 is mounted on a downward surface of the multilayer substrate 22. A plurality of wiring lines 50 are arranged inside the multilayer substrate 22. The baseband integrated circuit element 51 is sealed by the sealing resin layer 25. A plurality of conductor posts 52 is buried in the sealing resin layer 25. The plurality of conductor posts 52 each extend from the downward surface of the multilayer substrate 22 and reach a downward surface of the sealing resin layer 25.

The communication module has a substantially rectangular shape in the plan view, and the plurality of conductor posts 52 are arranged along edges of the sealing resin layer 25, which has a substantially rectangular shape, in such a manner as to line up along slightly inner side of each edge as illustrated in FIG. 1C. The radio frequency integrated circuit element 41 and the baseband integrated circuit element 51 are arranged in such a manner as to partially overlap each other in the plan view as illustrated in FIG. 1C.

Of the downward surface of the sealing resin layer 25, an area other than the area where the conductor posts 52 are arranged is covered with a bottom side ground plane 53. The bottom side ground plane 53 is connected to some of the conductor posts 52. A conductor film 54 composed of the same electrically conductive material as the bottom side ground plane 53 is placed on the respective downward end faces of the plurality of conductor posts 52. This conductor film 54 is used as a terminal for connecting with an external board such as a motherboard or the like.

A plurality of radiating elements 30 are arranged on a surface of the multilayer substrate 23, which faces in the upward direction. The plurality of radiating elements 30 are arranged in a substantially matrix form in the plan view as illustrated in FIG. 1B. For example, twenty-four radiating elements 30 are arranged in a 4×6 matrix. Examples of the radiating element include a patch antenna, a dipole antenna, a half-patch antenna, a monopole antenna, a horn antenna, an inverted-F antenna, an inverted-L antenna, a bow-tie antenna, a loop antenna, and a helical antenna.

The feed lines 37 respectively corresponding to the plurality of radiating elements 30 are arranged inside the multilayer substrate 23. A plurality of radio frequency ground planes 31, an antenna ground plane 32, a plurality of feed lines 38A, and a plurality of wiring lines 38B are arranged inside the multilayer substrate 21. FIG. 1A illustrates only one of the radio frequency ground planes 31. The antenna ground plane 32 is placed above the radio frequency ground plane 31 and provides a ground potential for the radiating elements 30. The antenna ground plane 32 and the radiating elements 30 form a patch antenna.

The feed lines 37 and 38A connect the radio frequency integrated circuit element 41 and the respective radiating elements 30. The radio frequency integrated circuit element 41 feeds power to the radiating elements 30 via the feed lines 38A and 37. The radio frequency ground plane 31 serves as a return path for the feed line 38A. For example, the feed line 38A and the radio frequency ground plane 31 form a strip line having a tri-plate structure.

A baseband ground plane 33 and a plurality of wiring lines 50 are arranged inside the multilayer substrate 22. The baseband ground plane 33 is arranged in such a manner as to overlap the radio frequency ground plane 31 and the antenna ground plane 32 in the plan view. The baseband ground plane 33 is connected to a ground terminal of the baseband integrated circuit element 51 and provides the ground potential for the baseband integrated circuit element 51.

The plurality of conductor posts 52 are each connected to the baseband integrated circuit element 51 via the wiring lines 50 inside the multilayer substrate 22. Furthermore, the baseband integrated circuit element 51 is connected to the radio frequency integrated circuit element 41 via the wiring lines 50 inside the multilayer substrate 22, the conductor posts 34 inside the sealing resin layer 24, and the wiring lines 38B inside the multilayer substrate 21.

A first inter-ground connection circuit 45 connects the baseband ground plane 33 and the radio frequency ground plane 31. The first inter-ground connection circuit 45 includes at least one conductor post 34. A second inter-ground connection circuit 46 connects an edge of the baseband ground plane 33 and an edge of the radio frequency ground plane 31. The second inter-ground connection circuit 46 includes at least one conductor post 34. In the plan view, a connecting part between the baseband ground plane 33 and the second inter-ground connection circuit 46 and a connecting part between the radio frequency ground plane 31 and the second inter-ground connection circuit 46 are arranged closer to the respective edges of the baseband ground plane 33 and the radio frequency ground plane 31 than a connecting part between the baseband ground plane 33 and the first inter-ground connection circuit 45 and a connecting part between the radio frequency ground plane 31 and the first inter-ground connection circuit 45.

Next, the functions of the communication module according to the first working example is described. The baseband integrated circuit element 51 performs the processing of baseband signals. The baseband integrated circuit element 51 supplies control signals and low frequency signals (for example, intermediate frequency signals) to the radio frequency integrated circuit element 41 via the wiring lines 50, the conductor posts 34, the wiring lines 38B, and the like. The radio frequency ground plane 31, the first inter-ground connection circuit 45, and the baseband ground plane 33 serve as return paths for the control signals and the low frequency signals. The "control signals" and the "low frequency signals" include a signal having a frequency component of a clock signal for the operation of the baseband integrated circuit element 51 and a digital-waveform signal having a substantially square wave shape, respectively.

Based on the control signals from the baseband integrated circuit element 51, the radio frequency integrated circuit element 41 generates a radio frequency signal by upconverting a low frequency signal and amplifies the power of the radio frequency signal. The radio frequency signal amplified in the radio frequency integrated circuit element 41 is supplied to the radiating elements 30 via the feed lines 38A and 37. Here, the "radio frequency signal" is a signal having a frequency component corresponding to the frequency of a radio wave to be emitted from an antenna.

A radio frequency signal received with the radiating elements 30 is inputted to the radio frequency integrated circuit element 41 via the feed lines 37 and 38A. The radio frequency integrated circuit element 41 generates a low frequency signal by downconverting the inputted radio frequency signal. This low frequency signal is inputted to the baseband integrated circuit element 51.

Figure 2A:
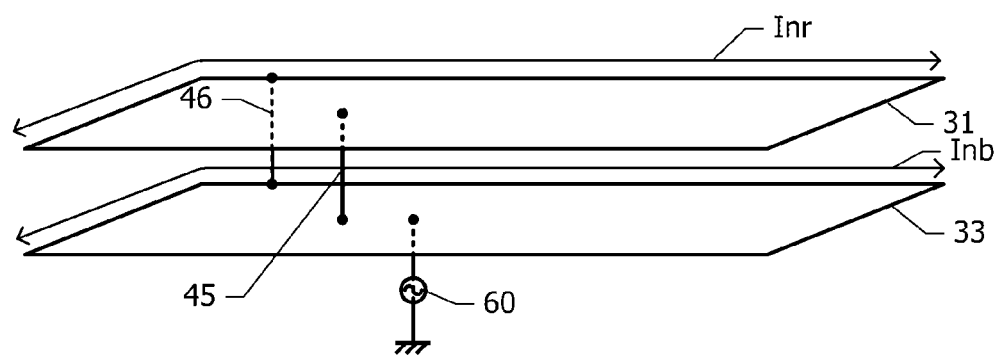
FIG. 2A is a schematic diagram illustrating a radio frequency ground plane, a baseband ground plane, a first inter-ground connection circuit, and a second inter-ground connection circuit of the communication module according to the first working example.
Figure 2B:
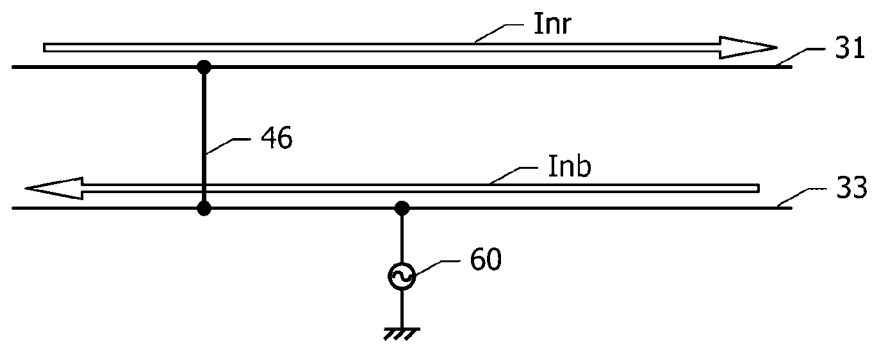
FIG. 2B is a schematic diagram of paths through which noise currents flow.

Next, referring to FIG. 2A and FIG. 2B, advantageous effects of the first working example are described. FIG. 2A is a schematic diagram illustrating the radio frequency ground plane 31, the baseband ground plane 33, the first inter-ground connection circuit 45, and the second inter-ground connection circuit 46 of the communication module according to the first working example. The radio frequency ground plane 31 and the baseband ground plane 33 are arranged in such a manner as to be substantially parallel to each other and substantially overlap with each other in the plan view. The radio frequency ground plane 31 and the baseband ground plane 33 each have a substantially rectangular shape in the plan view. The first inter-ground connection circuit 45 connects the baseband ground plane 33 and the radio frequency ground plane 31 at their deep inner parts. The second inter-ground connection circuit 46 connects the baseband ground plane 33 and the radio frequency ground plane 31 at their edges.

Digital noise generated in the baseband integrated circuit element 51 (FIG. 1A) propagates to the baseband ground plane 33. This generates a noise current Inb inside the baseband ground plane 33. In FIG. 2A, it is assumed that a noise source 60 generating this digital noise is connected to the baseband ground plane 33.

A noise current Inr is generated also in the radio frequency ground plane 31 due to the coupling between the baseband ground plane 33 and the radio frequency ground plane 31. This causes a spurious emission from the baseband ground plane 33 and the radio frequency ground plane 31. In particular, the noise currents Inb and Inr flowing along the respective edges of the baseband ground plane 33 and the radio frequency ground plane 31 cause spurious emissions. The distribution of noise currents generated in the radio frequency ground plane 31 and the baseband ground plane 33 varies depending on the frequency of generated noise. For example, there is a case where the total length of two adjacent sides of the radio frequency ground plane 31 corresponds to about a half-wavelength of the noise current or an integer multiple thereof, or a case where the length of a single long side or a single short side of the radio frequency ground plane 31 corresponds to about a half-wavelength of the noise current or an integer multiple thereof.

FIG. 2B is a schematic diagram of paths along which the noise currents flow. Because the spurious emissions are mainly caused by the noise currents Inr and Inb flowing along the edges of the radio frequency ground plane 31 and the baseband ground plane 33, in FIG. 2B, the edges of the radio frequency ground plane 31 and the baseband ground plane 33 are each represented by an one-dimensional straight line. Because the second inter-ground connection circuit 46 is connected to the edges of the radio frequency ground plane 31 and the baseband ground plane 33, in FIG. 2B, the one-dimensional straight lines corresponding to the edges of the radio frequency ground plane 31 and the baseband ground plane 33 are connected to each other by the second inter-ground connection circuit 46.

The noise current Inb is generated in the baseband ground plane 33 by the noise source 60, and the noise current Inr is generated in the radio frequency ground plane 31 by coupling the baseband ground plane 33 and the radio frequency ground plane 31. The phase of the noise current Inr becomes substantially opposite to the phase of the noise current Inb by adjusting the connecting part of the second inter-ground connection circuit 46 and the impedance of the second inter-ground connection circuit 46.

The spurious emissions can be suppressed by making the phases of the noise current Inb and the noise current Inr substantially opposite to each other. Note that the noise current Inb and the noise current Inr are not necessarily in completely opposite phase. It is desirable that the connecting part and the impedance of the second inter-ground connection circuit 46 are adjusted in such a way that the spurious emission based on the noise current Inb and the spurious emission based on the noise current Inr weaken each other.

Next, referring to the drawings from FIG. 3A to FIG. 5C, simulations that have been performed to confirm the advantageous effects of the first working example and their results are described.

Figure 3A:
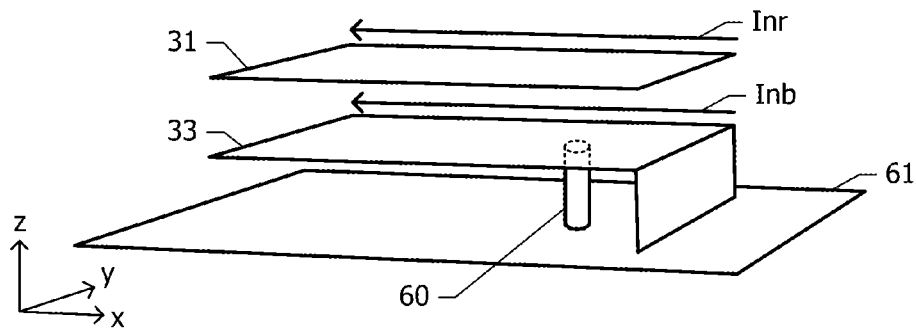
FIG. 3A is a perspective view of a simulation model.
Figure 4A:
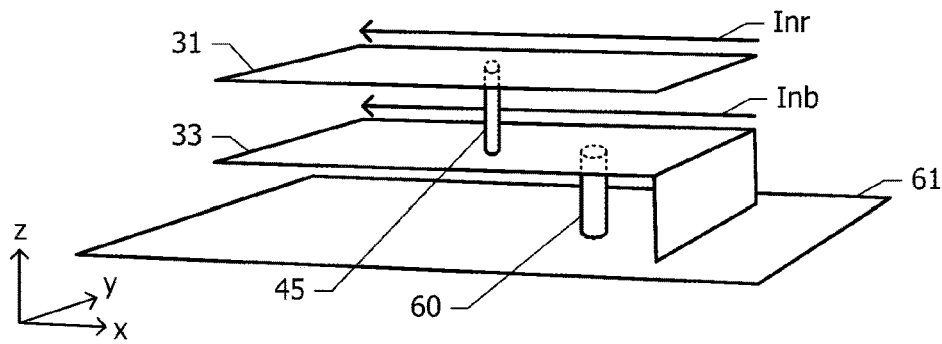
FIG. 4A is a perspective view of another simulation model.
Figure 5A:
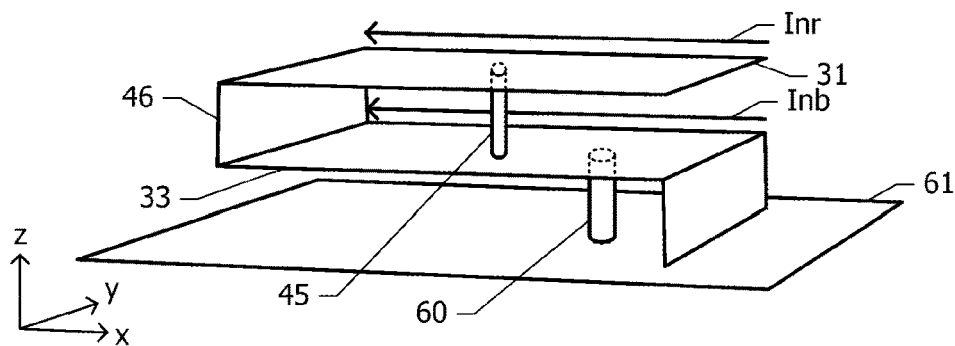
FIG. 5A is a perspective view of still another simulation model.

FIG. 3A, FIG. 4A, and FIG. 5A are each a perspective view of a simulation model. In each of the simulation models, the baseband ground plane 33 and the radio frequency ground plane 31 are stacked in this order on a ground plane 61 of a motherboard. Here, a x-y-z rectangular coordinate system is defined in which the x-y plane is a plane substantially parallel to the ground plane 61, the baseband ground plane 33, and the radio frequency ground plane 31, and the positive direction of the z-axis is the direction looking at the radio frequency ground plane 31 from the ground plane 61.

The baseband ground plane 33 and the radio frequency ground plane 31 are each a substantially square shape in which each side has a length of about 20 mm and is substantially parallel to the x-axis or the y-axis. The ground plane 61 is larger than both the baseband ground plane 33 and the radio frequency ground plane 31. The edge of the baseband ground plane 33 on the positive side of the x-axis, which is substantially parallel to the y-axis, is connected to the ground plane 61. Noise is provided from the noise source 60 to the baseband ground plane 33. It is assumed that the frequency of the noise is about 2.4 GHz.

In the simulation model illustrated in FIG. 3A, the baseband ground plane 33 and the radio frequency ground plane 31 are not connected to each other and are capacitively coupled. In the simulation model illustrated in FIG. 4A, the baseband ground plane 33 and the radio frequency ground plane 31 are connected to each other at their deep inner parts by the first inter-ground connection circuit 45. In the simulation model illustrated in FIG. 5A, the first inter-ground connection circuit 45 is placed as is the case with the simulation model illustrated in FIG. 4A, and further the baseband ground plane 33 and the radio frequency ground plane 31 are connected to each other by the second inter-ground connection circuit 46 at their edges on the negative side of the x-axis, which is substantially parallel to the y-axis. The first inter-ground connection circuit 45 and the second inter-ground connection circuit 46 of the simulation model correspond to the first inter-ground connection circuit 45 and the second inter-ground connection circuit 46 of the communication module according to the first working example (FIG. 1A and FIG. 2A), respectively.

Figure 3B:
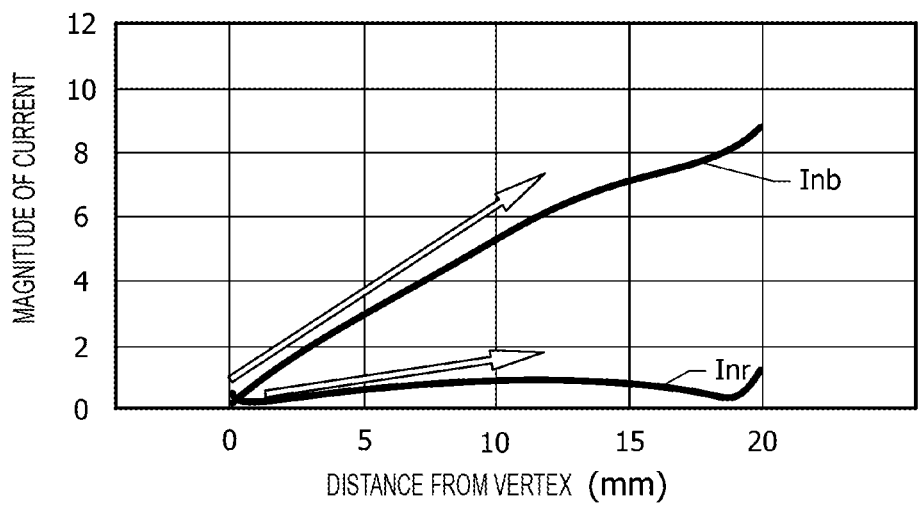
FIG. 3B is a graph illustrating a distribution of noise currents generated in respective edges of a baseband ground plane and a radio frequency ground plane of the simulation model, which are substantially parallel to the x-axis.
Figure 4B:
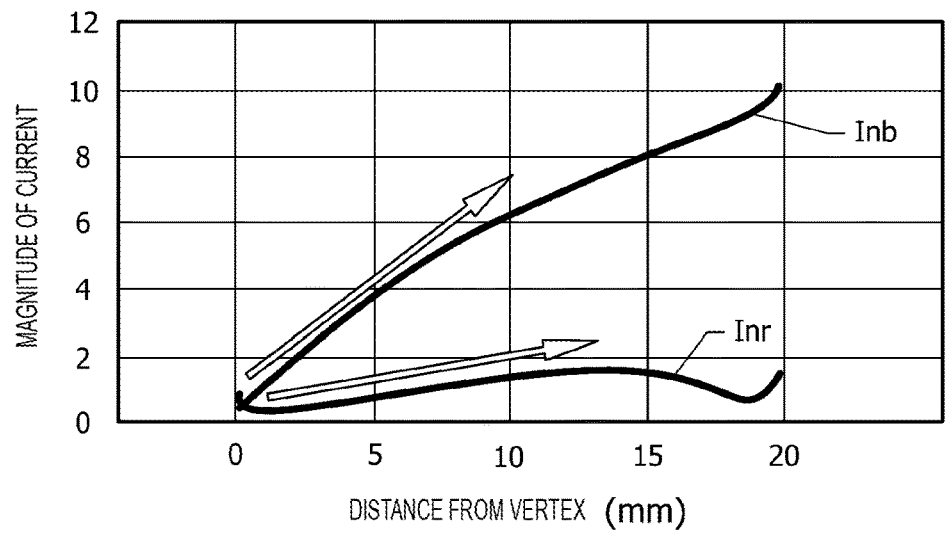
FIG. 4B is a graph illustrating a distribution of noise currents generated in respective edges of a baseband ground plane and a radio frequency ground plane of the simulation model, which are substantially parallel to the x-axis.
Figure 5B:
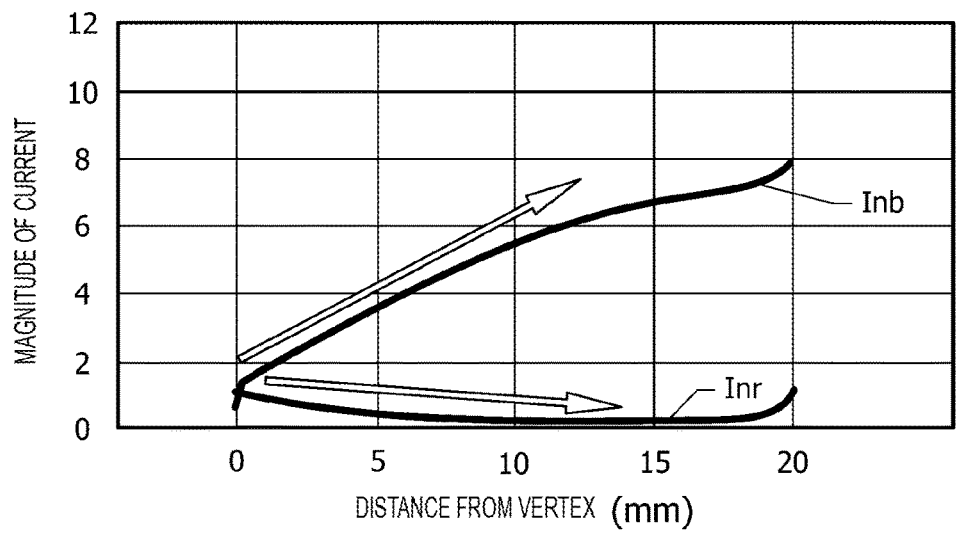
FIG. 5B is a graph illustrating a distribution of noise currents generated in respective edges of a baseband ground plane and a radio frequency ground plane of the simulation model, which are substantially parallel to the x-axis.

FIG. 3B, FIG. 4B, and FIG. 5B are graphs illustrating distributions of the noise currents Inb and Inr generated in the respective edges of the baseband ground plane 33 and the radio frequency ground plane 31, which are substantially parallel to the x-axis, in the simulation models illustrated in FIG. 3A, FIG. 4A, and FIG. 5A, respectively. The horizontal axis represents the distance from the vertex on the negative side of the x-axis in "mm", and the vertical axis represents the magnitude of the current in an arbitrary scale. The curves in the graph represent the magnitudes of the noise currents Inb and Inr generated at the respective edges of the baseband ground plane 33 and the radio frequency ground plane 31.

In the simulation models illustrated in FIG. 3A and FIG. 4A, as the distance from the vertex increases, both the noise currents Inb and Inr exhibit an increasing trend. Whereas, in the simulation model illustrated in FIG. 5A, as the distance from the vertex increases, the noise current Inb exhibits an increasing trend while the noise current Inr exhibits a decreasing trend.

As described above, in the simulation model illustrated in FIG. 5A, the increasing/decreasing trends of the noise current Inb and the noise current Inr are opposite. Therefore, the spurious emissions caused by the noise currents Inb and Inr weaken each other.

Figure 3C:
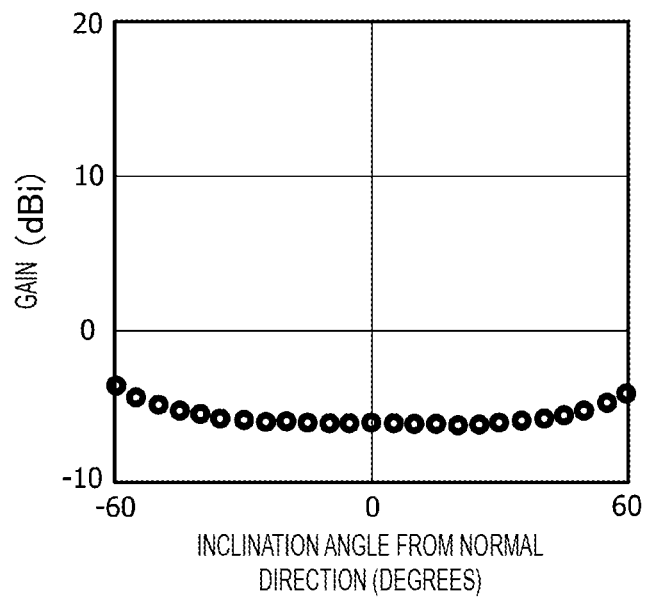
FIG. 3C is a graph illustrating the gain when the baseband ground plane and the radio frequency ground plane of the simulation model are considered as antennas.
Figure 4C:
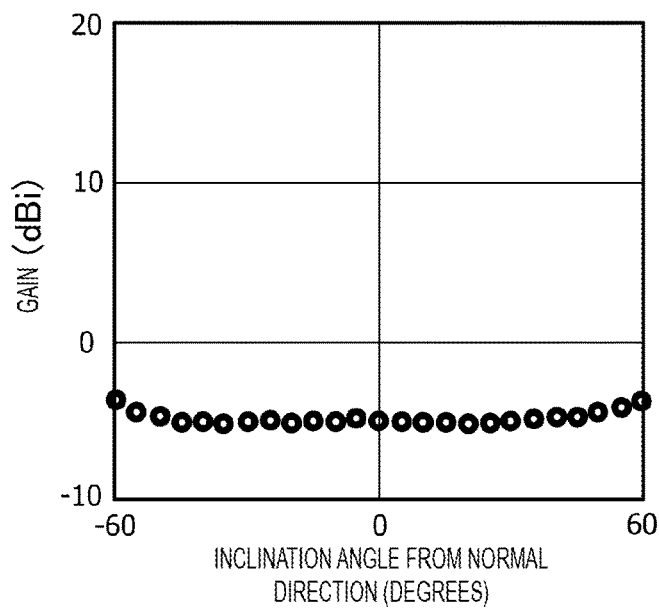
FIG. 4C is a graph illustrating the gain when the baseband ground plane and the radio frequency ground plane of the simulation model are considered as antennas.
Figure 5C:
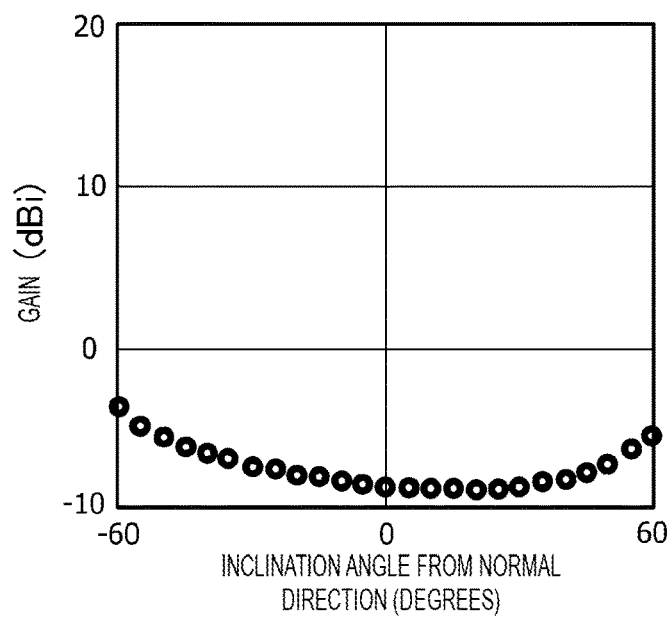
FIG. 5C is a graph illustrating the gain when the baseband ground plane and the radio frequency ground plane of the simulation model are considered as antennas.

FIG. 3C, FIG. 4C, and FIG. 5C are graphs illustrating the gains when the baseband ground plane 33 and the radio frequency ground plane 31 are considered as antennas in the simulation models illustrated in FIG. 3A, FIG. 4A, and FIG. 5A, respectively. The horizontal axis represents the inclination angle from the normal direction (positive direction of the z-axis) to the x-axis direction in "degrees", and the vertical axis represents the gain in "dBi". The direction where the inclination angle is equal to zero degrees coincides with the z-axis direction. Note that the angle of an inclination from the normal direction (z-axis direction) to the positive side of the x-axis direction is defined as positive.

It is found that the gain in the simulation model of FIG. 5A is smaller than the gains in the simulation models of FIG. 3A and FIG. 4A. This means that the spurious emission from the simulation model of FIG. 5A is smaller than the spurious emissions from the simulation models of FIG. 3A and FIG. 4A. This simulation confirmed that the spurious emission can be suppressed by connecting the baseband ground plane 33 and the radio frequency ground plane 31 with the second inter-ground connection circuit 46.

Figure 6A:
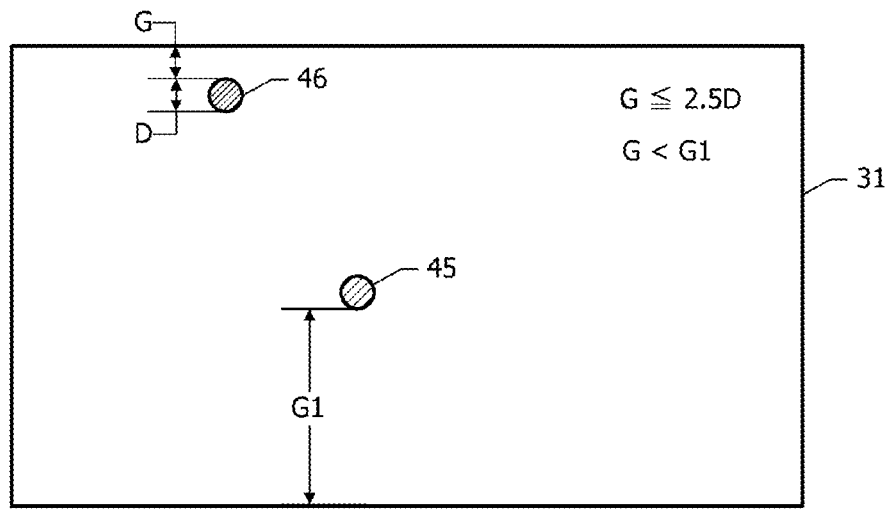
FIG. 6A is a diagram illustrating a spatial relationship in a plan view of the radio frequency ground plane, the first inter-ground connection circuit, and the second inter-ground connection circuit.

Next, referring to FIG. 6A, a preferable distance between the second inter-ground connection circuit 46 and the edge of the radio frequency ground plane 31 is described. Note that a preferable distance between the second inter-ground connection circuit 46 and the edge of the baseband ground plane 33 is similar to the preferable distance between the second inter-ground connection circuit 46 and the edge of the radio frequency ground plane 31, and thus the description thereof is omitted.

FIG. 6A is a diagram illustrating a spatial relationship in the plan view of the radio frequency ground plane 31, the first inter-ground connection circuit 45, and the second inter-ground connection circuit 46. The first inter-ground connection circuit 45 is connected to a deep inner part of the radio frequency ground plane 31. The second inter-ground connection circuit 46 is placed at a location closer to the edge of the radio frequency ground plane 31 than the first inter-ground connection circuit 45. In other words, the shortest distance G from the second inter-ground connection circuit 46 to the edge of the radio frequency ground plane 31 is shorter than the shortest distance G1 from the first inter-ground connection circuit 45 to the edge of the radio frequency ground plane 31.

A noise current flowing in the vicinity of the edge of the radio frequency ground plane 31 is a primary cause of spurious emission. It is preferable that the second inter-ground connection circuit 46 is placed as close as possible to the edge of the radio frequency ground plane 31 in order to efficiently exert influence on the phase of the noise current flowing in the vicinity of the edge. For example, it is preferable that the shortest distance G is set to 2.5 times the diameter D of the conductor post of the second inter-ground connection circuit 46 or less. However, from the viewpoint of conditions arising from constraint in a fabrication process and mechanical strength, the second inter-ground connection circuit 46 cannot be placed indefinitely close to the edge of the radio frequency ground plane 31. It is preferable that the shortest distance G is determined in such a manner as to satisfy the conditions arising from constraint in the fabrication process and ensure sufficient mechanical strength.

Figure 6B:
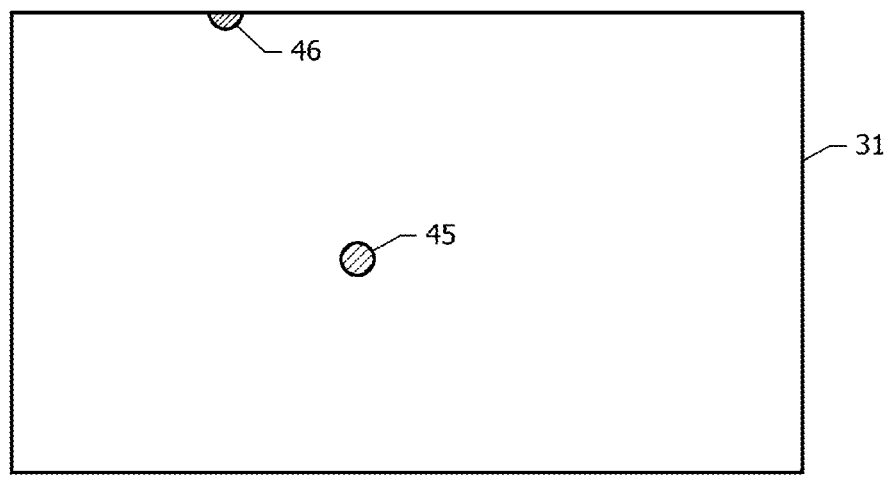
FIG. 6B is a diagram illustrating a spatial relationship in the plan view of the radio frequency ground plane, the first inter-ground connection circuit, and the second inter-ground connection circuit.

FIG. 6B is a diagram illustrating another spatial relationship in the plan view of the radio frequency ground plane 31, the first inter-ground connection circuit 45, and the second inter-ground connection circuit 46. The conductor post of the second inter-ground connection circuit 46 has a substantially semi-cylinder shape, which is obtained by cutting a cylinder in half by a plane including a central axis. The plane passing through the central axis of the cylinder is aligned with the edge of the radio frequency ground plane 31. In this case, the shortest distance G from the second inter-ground connection circuit 46 to the edge of the radio frequency ground plane 31 is equal to zero.

Figure 6C:
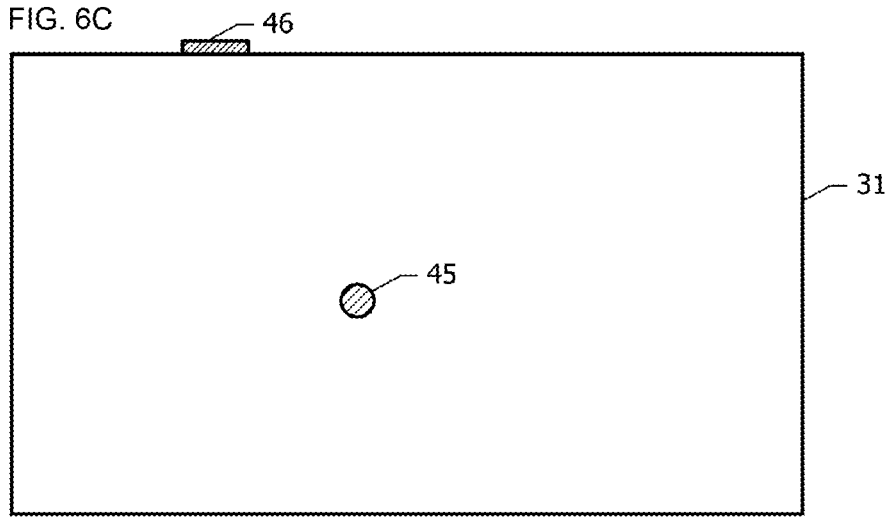
FIG. 6C is a diagram illustrating a spatial relationship in the plan view of the radio frequency ground plane, the first inter-ground connection circuit, and the second inter-ground connection circuit.

FIG. 6C is a diagram illustrating still another spatial relationship in the plan view of the radio frequency ground plane 31, the first inter-ground connection circuit 45, and the second inter-ground connection circuit 46. In the plan view, a metal film that forms the second inter-ground connection circuit 46 is placed on the outer side portion of an edge of the radio frequency ground plane 31. This metal film is in contact with the end faces of the radio frequency ground plane 31 and the baseband ground plane 33.

In all of the configurations of FIG. 6A, FIG. 6B, and FIG. 6C, the second inter-ground connection circuit 46 connects the baseband ground plane 33 and the radio frequency ground plane 31 at their edges or in the vicinity of their edges.

Figure 7A:
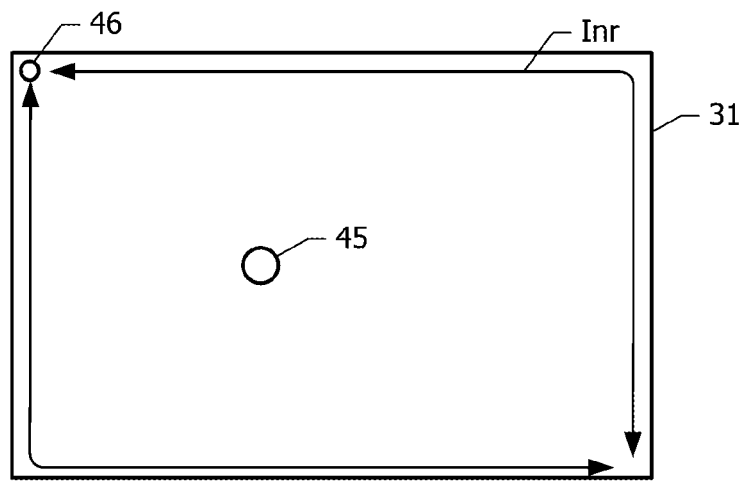
FIG. 7A is a diagram illustrating a spatial relationship in a plan view of the radio frequency ground plane, the baseband ground plane, the first inter-ground connection circuit, and the second inter-ground connection circuit.
Figure 7B:
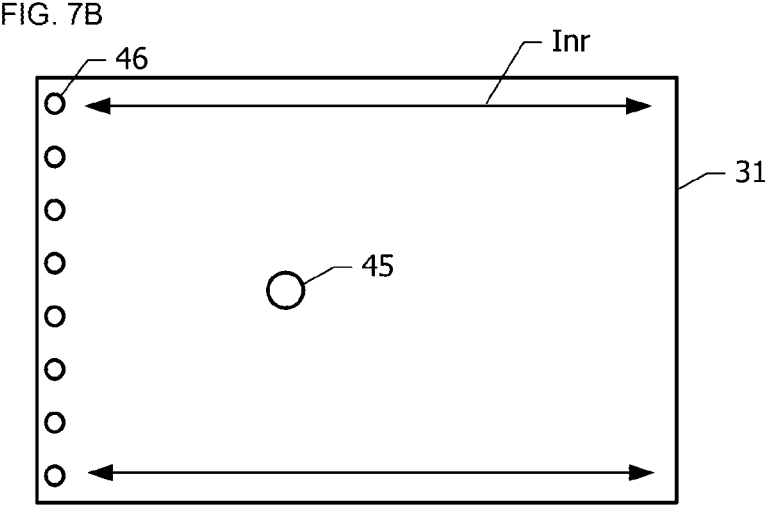
FIG. 7B is a diagram illustrating a spatial relationship in the plan view of the radio frequency ground plane, the baseband ground plane, the first inter-ground connection circuit, and the second inter-ground connection circuit.
Figure 7C:
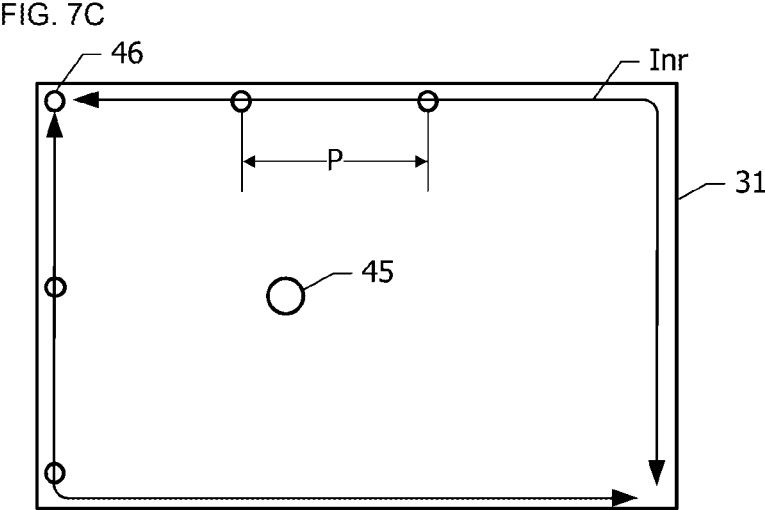
FIG. 7C is a diagram illustrating a spatial relationship in the plan view of the radio frequency ground plane, the baseband ground plane, the first inter-ground connection circuit, and the second inter-ground connection circuit.

Next, referring to FIG. 7A, FIG. 7B, and FIG. 7C, communication modules according to modification examples of the first working example are described.

FIG. 7A, FIG. 7B, and FIG. 7C are diagrams illustrating spatial relationships in the plan view of the radio frequency ground plane 31, the first inter-ground connection circuit 45, and the second inter-ground connection circuit 46. In the first working example illustrated in FIG. 2A, the second inter-ground connection circuit 46 is connected to the radio frequency ground plane 31 at a location slightly inner side of one of edges of the radio frequency ground plane 31. Whereas, in the modification example illustrated in FIG. 7A, the second inter-ground connection circuit 46 is connected to the radio frequency ground plane 31 at a location in the vicinity of a vertex of the radio frequency ground plane 31. Note that in the modification example illustrated in FIG. 7A, it can also be said that the second inter-ground connection circuit 46 is connected to the radio frequency ground plane 31 at a location in the vicinity of one of edges of the radio frequency ground plane 31.

A noise current Inr whose half-wavelength is substantially equal to the sum of lengths of the long side and the short side is likely to be excited in between a vertex at which the second inter-ground connection circuit 46 is connected and the diagonally opposite vertex.

In the modification example illustrated in FIG. 7B, a plurality of second inter-ground connection circuits 46 are arranged along an edge corresponding to the short side of the radio frequency ground plane 31. In this case, a noise current Inr whose half-wavelength is substantially equal to the length of a long side is likely to be excited at an edge corresponding to the long side of the radio frequency ground plane 31.

In the modification example illustrated in FIG. 7C, a plurality of second inter-ground connection circuits 46 are arranged along two mutually adjacent edges of the radio frequency ground plane 31 at substantially equal intervals. No second inter-ground connection circuit 46 is placed in the vicinity of two other edges. In this case, a noise current Inr whose half-wavelength is substantially equal to the pitch P of the plurality of second inter-ground connection circuits 46 is likely to be excited in between a vertex at which two edges, along which the second inter-ground connection circuit 46 are arranged, and the diagonally opposite vertex.

The modification examples illustrated in FIG. 7A, FIG. 7B, and FIG. 7C enable to effectively suppress a spurious emission having a frequency corresponding to the wavelength of the noise current Inr likely to be excited. In other words, it is desirable to adjust the position of the second inter-ground connection circuits 46 depending on the frequency of spurious emission likely to be generated. This enables to efficiently suppress the spurious emission likely to be generated.

In the modification example illustrated in FIG. 7A, if another second inter-ground connection circuit 46 is placed in the vicinity of the vertex diagonally opposite to the vertex at which the second inter-ground connection circuit 46 has been placed, the noise current Inr generated in the radio frequency ground plane 31 and the noise current Inb generated in the baseband ground plane 33 will not be in the opposite phase. In the modification examples illustrated in FIG. 7B and FIG. 7C, if another second inter-ground connection circuit 46 is placed on a side opposite to the side on which the second inter-ground connection circuit 46 has been placed, the noise current Inr generated in the radio frequency ground plane 31 and the noise current Inb generated in the baseband ground plane 33 will not be in the opposite phase.

In order to make the phases of the noise current Inr generated in the radio frequency ground plane 31 and the noise current Inb generated in the baseband ground plane 33 substantially opposite to each other, it is preferable to have a configuration in which the second inter-ground connection circuit 46 is placed at one of two opposite edges and the second inter-ground connection circuit 46 is not placed at the other edge. In other words, it is desirable that the connecting part between the radio frequency ground plane 31 and the second inter-ground connection circuit 46 is placed on the one side of a certain imaginary straight line that passes substantially the geometric center of the radio frequency ground plane 31 in the plan view, and that no connecting part is placed on the other side. Similarly, it is desirable that the connecting part between the baseband ground plane 33 and the second inter-ground connection circuit 46 is placed on the one side of a certain imaginary straight line that passes substantially the geometric center of the baseband ground plane 33 in the plan view, and that no connecting part is placed on the other side.

Next, a preferable position of the connecting part between the radio frequency ground plane 31 and the second inter-ground connection circuit 46 (FIG. 2A and FIG. 2B) is described. First, the state where the baseband ground plane 33 and the radio frequency ground plane 31 are not connected by the second inter-ground connection circuit 46 is considered. Due to the digital noise generated by the noise source 60, a noise current is generated in the baseband ground plane 33. A straight line connecting a part where this noise current becomes a maximum and a part where this noise current becomes a minimum becomes a substantive wave source, and noise is emitted from this wave source. Furthermore, a noise current is also generated in the radio frequency ground plane 31 due to the coupling between the baseband ground plane 33 and the radio frequency ground plane 31.

When the baseband ground plane 33 and the radio frequency ground plane 31 are connected by the second inter-ground connection circuit 46 having a low impedance, the magnitude and phase of the noise current generated in these two ground planes change. This change depends on the location at which the second inter-ground connection circuit 46 is connected. In order to suppress the emission of noise, it is preferable to select the location of the connecting part of the second inter-ground connection circuit 46 in such a way that the magnitude of the noise current generated in the baseband ground plane 33 decreases compared with the magnitude of the noise current before connecting the second inter-ground connection circuit 46. Furthermore, it is preferable to select the location of the connecting part of the second inter-ground connection circuit 46 in such a way that the noise current generated in the baseband ground plane 33 and the noise current generated in the radio frequency ground plane 31 are in mutually opposite phases.

Next, still another modification example of the first working example is described. In the first working example, the communication module that operates on a single frequency band is described. However, it is possible to provide a communication module that operates on two frequency bands. For example, the radiating element 30 can be used as a radiating element for a 28 GHz band, and the antenna ground plane 32 can be used as a radiating element for a 6 GHz band. In this case, the antenna ground plane 32 that operates as a radiating element for a 6 GHz band and the baseband ground plane 33 may be connected by the second inter-ground connection circuit 46. This configuration enables to suppress the spurious emission by adjusting the phases of a noise current generated in a radiating element operating on a relatively low frequency (a ground plane of a radiating element operating on a relatively high frequency) and a noise current generated in the baseband ground plane 33.

Second Working Example

Figure 8A:
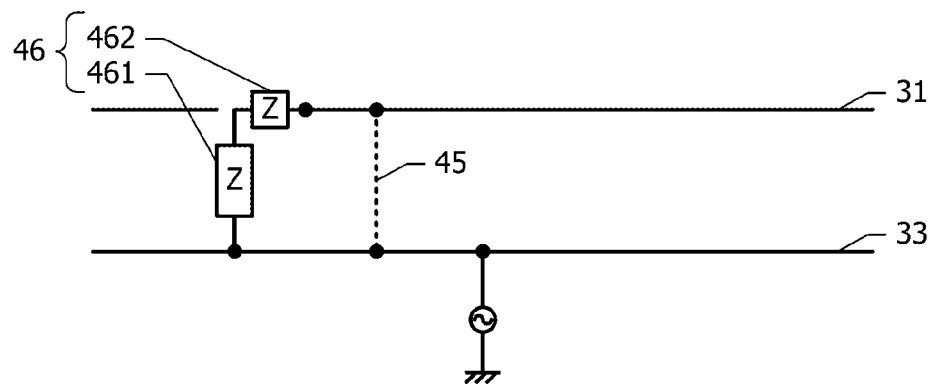
FIG. 8A is a schematic diagram illustrating a connection configuration of a baseband ground plane, a radio frequency ground plane, a first inter-ground connection circuit, and a second inter-ground connection circuit of a communication module according to a second working example.
Figure 8B:
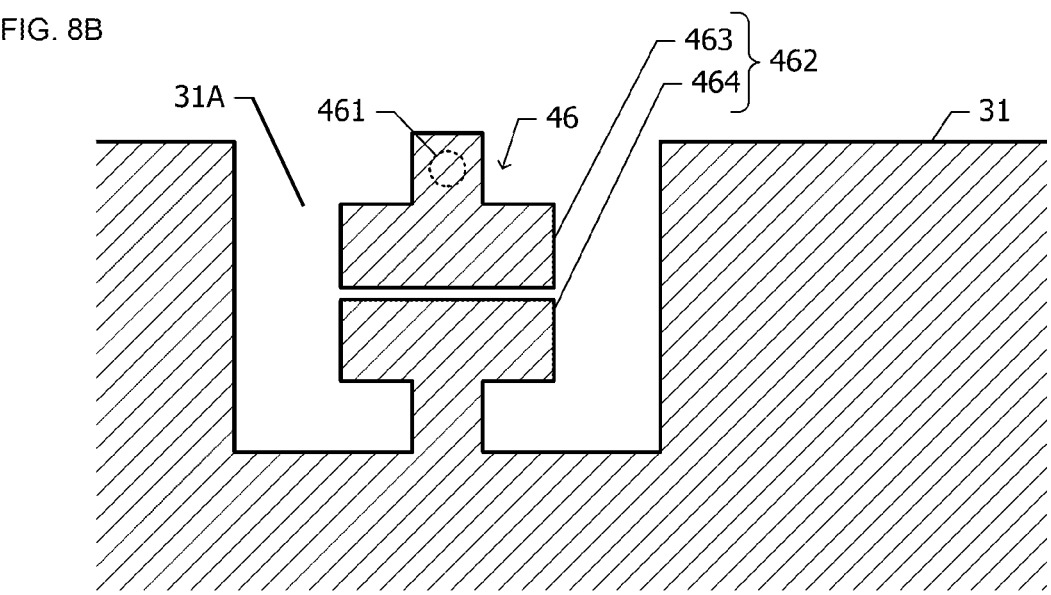
FIG. 8B is a plan view illustrating an exemplary inter-ground connection circuit.
Figure 8C:
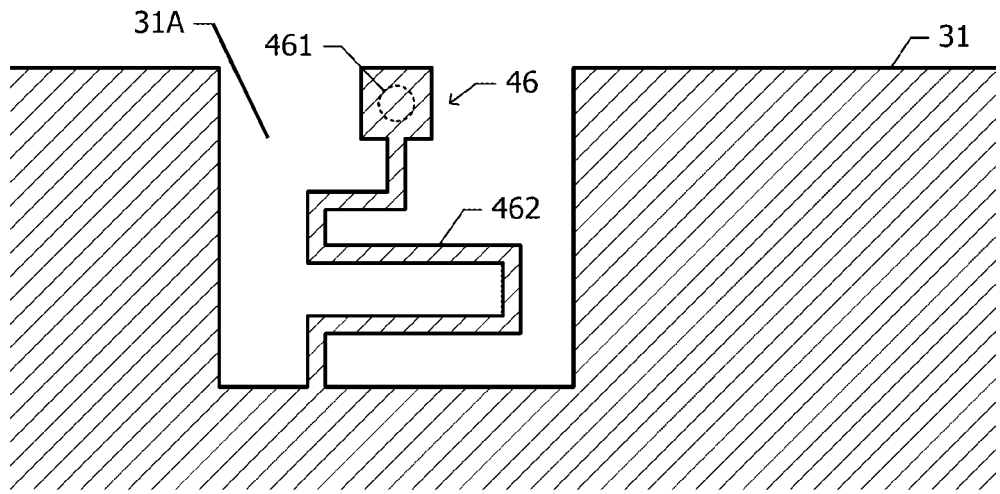
FIG. 8C is a plan view illustrating an exemplary inter-ground connection circuit.

Next, referring to the drawings from FIG. 8A to FIG. 8C, a communication module according to the second working example is described. Hereinafter, the description regarding the configuration common to the communication module according to the first working example (FIG. 1A to FIG. 2B) is omitted.

FIG. 8A is a schematic diagram illustrating a connection configuration of the baseband ground plane 33, the radio frequency ground plane 31, the first inter-ground connection circuit 45, and the second inter-ground connection circuit 46 of the communication module according to the second working example. In the first working example, the second inter-ground connection circuit 46 is formed using the conductor post. Therefore, the second inter-ground connection circuit 46 has a parasitic resistance and a parasitic inductance originated with the conductor post. Whereas, in the second working example, a circuit having an impedance Z is used as the second inter-ground connection circuit 46.

The second inter-ground connection circuit 46 includes an inter-layer portion 461 and an intra-layer portion 462. The inter-layer portion 461 is formed of a conductor post extending in a thickness direction that separates the baseband ground plane 33 and the radio frequency ground plane 31. The intra-layer portion 462 is formed of a conductor pattern, and the conductor pattern and the radio frequency ground plane 31 are provided in the same conductor layer. The intra-layer portion 462 connects the inter-layer portion 461 and at least one of the baseband ground plane 33 and the radio frequency ground plane 31.

FIG. 8B is a plan view illustrating one example of the second inter-ground connection circuit 46. A cut part 31A is formed in the radio frequency ground plane 31 from an edge to the inner side thereof. The second inter-ground connection circuit 46 is placed inside the cut part 31A in the plan view. The second inter-ground connection circuit 46 is formed of the inter-layer portion 461 and the intra-layer portion 462. The intra-layer portion 462 is formed of two conductor patterns 463 and 464 arranged in such a manner as to be separated from each other with a minute gap in the in-plane direction. The conductor pattern 463, which is one of the two conductor patterns, is connected to an upper end portion of the inter-layer portion 461. The conductor pattern 464, which is the other conductor pattern, is connected to the radio frequency ground plane 31. The two conductor patterns 463 and 464 are capacitively coupled to each other. This allows the second inter-ground connection circuit 46 to have a capacitance component.

FIG. 8C is a plan view illustrating another example of the second inter-ground connection circuit 46. In the example illustrated in FIG. 8C, the intra-layer portion 462 is formed of a conductor pattern having a substantially elongated meander shape. This allows the intra-layer portion 462 to have an inductance component.

Next, advantageous effects of the second working example are described. The second working example enables to increase flexibility in adjustment of the impedance of the second inter-ground connection circuit 46 by including the intra-layer portion 462 in the second inter-ground connection circuit 46. This increases flexibility in adjustment of the phases of the noise current Inb generated in the baseband ground plane 33 and the noise current Inr generated in the radio frequency ground plane 31. An effect of suppressing the spurious emission can be increased by adjusting the phases of the noise current Inb and the noise current Inr. The first inter-ground connection circuit 45 has a structure that reduces the absolute value of impedance of the first inter-ground connection circuit 45 as much as possible so as to allow radio frequency signals to flow. Accordingly, it is preferable to make an adjustment in such a way that the absolute value of impedance of the second inter-ground connection circuit 46 is higher than the absolute value of impedance of the first inter-ground connection circuit 45. Here, the "impedance" means an impedance in the operating frequency band of the radiating element 30.

Next, modification examples of the second working example are described. In FIG. 8B and FIG. 8C, the intra-layer portion 462 is placed in the same conductor layer as the radio frequency ground plane 31. However, the intra-layer portion 462 may be placed in the same conductor layer as the baseband ground plane 33. Alternatively, the intra-layer portion 462 may be placed in both the conductor layers of the baseband ground plane 33 and the radio frequency ground plane 31.

Third Working Example

Figure 9A:
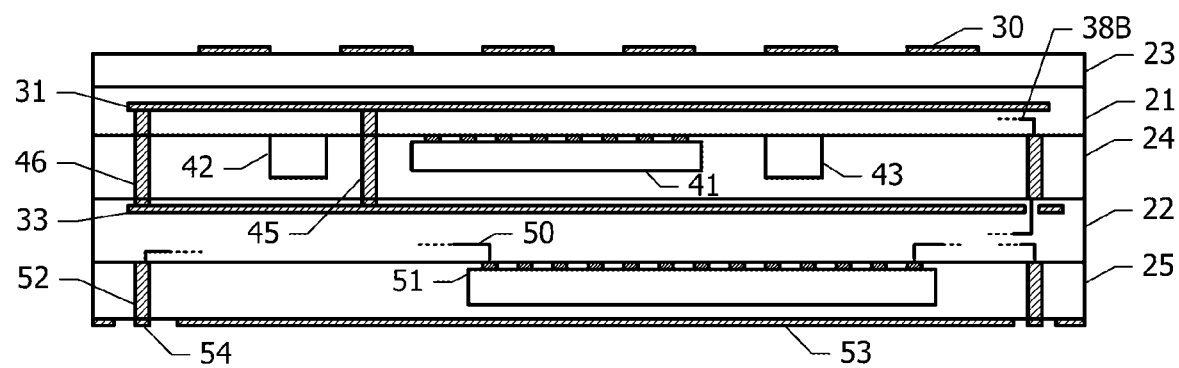
FIG. 9A is a cross-sectional view of a communication module according to a third working example.
Figure 9B:
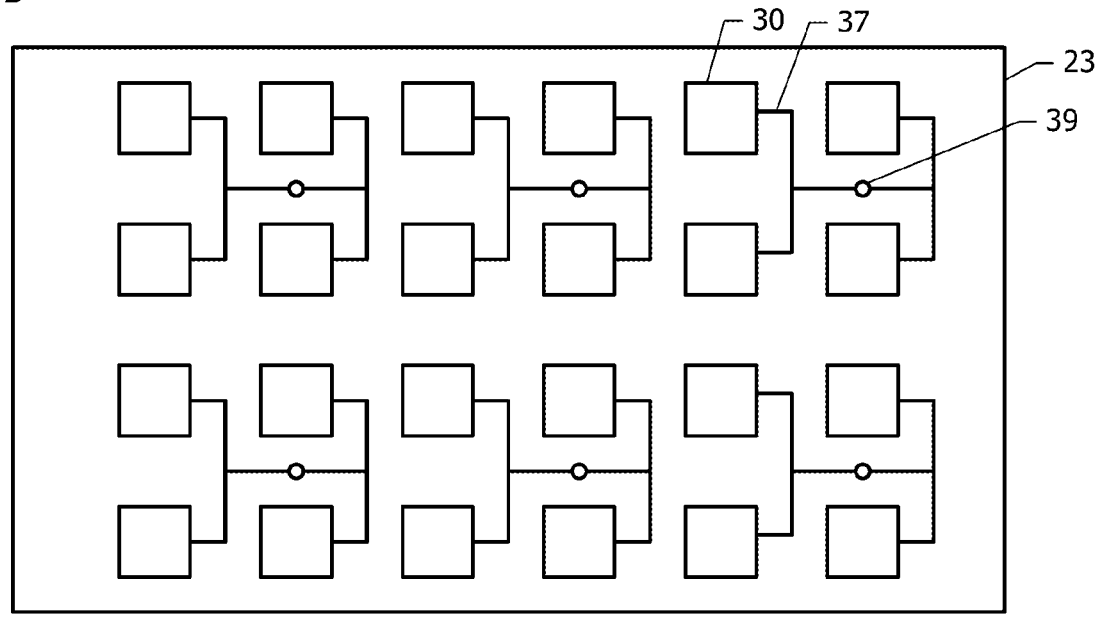
FIG. 9B is a plan view of the communication module according to the third working example.

Next, referring to FIG. 9A and FIG. 9B, a communication module according to the third working example is described. Hereinafter, the description regarding the configuration common to the communication module according to the first working example (FIG. 1A to FIG. 2B) is omitted.

FIG. 9A and FIG. 9B are a cross-sectional view and a plan view of a communication module according to the third working example, respectively. In the first working example, the feed lines 37 extend downward from the radiating elements 30. Whereas, in the third working example, the feed lines 37 extend in the in-plane direction (lateral direction) from the radiating elements 30, and a plurality of the feed lines 37 extending from a plurality of the radiating elements 30 are joined together at a joining point 39. Then, from the joining point 39, the feed lines extend downward.

The radio frequency ground plane 31 placed on the topmost position functions as an antenna ground plane that provides the ground potential for the radiating elements 30. Here, the "antenna ground plane" means a ground plane that is placed close to a radiating element of an antenna and forms the antenna together with the radiating element. The "radio frequency ground plane" means a ground plane that is placed for stabilizing a reference potential of a radio frequency circuit or the impedance of the feed line.

Next, advantageous effects of the third working example are described. In the third working example, the second inter-ground connection circuit 46 connects the radio frequency ground plane 31, which also serves as the antenna ground plane, and the baseband ground plane 33. Spurious emissions can be suppressed by adjusting the phase of a noise current generated in the radio frequency ground plane 31, which also serves as the antenna ground plane, and the phase of a noise current generated in the baseband ground plane 33.

Fourth Working Example

Figure 10A:
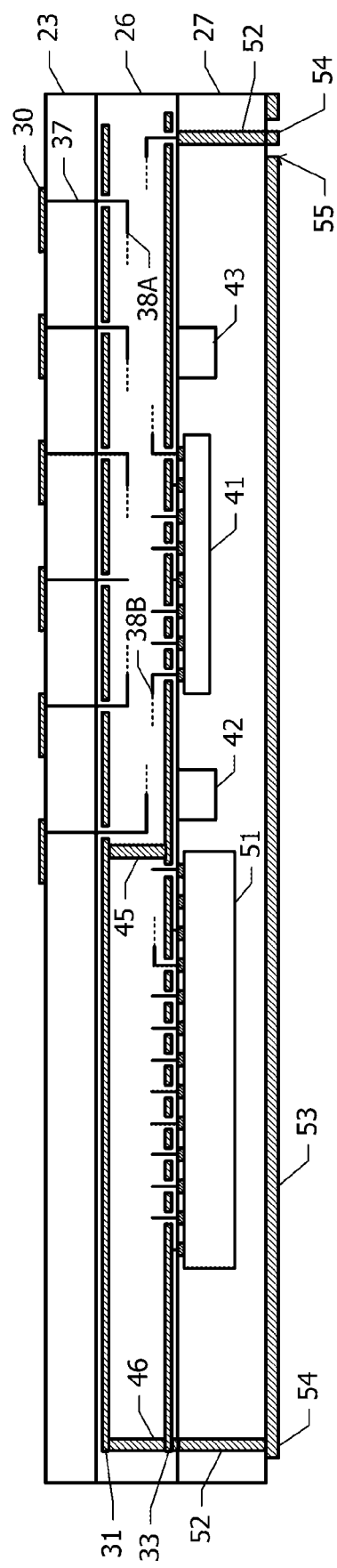
FIG. 10A is a cross-sectional view of a communication module according to a fourth working example.
Figure 10B:
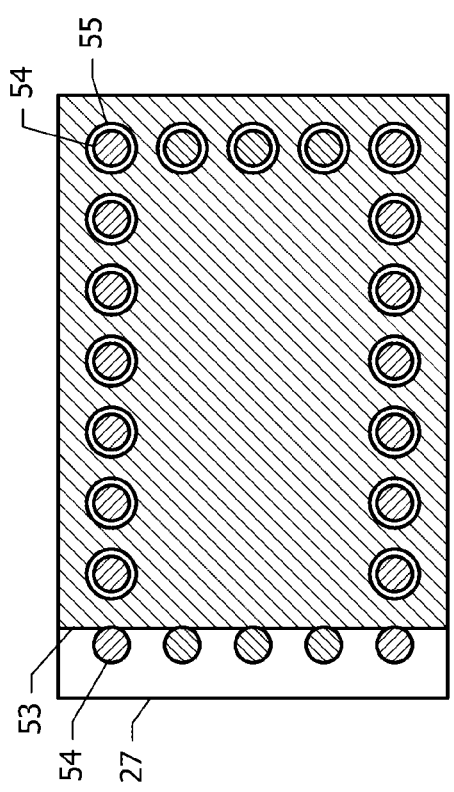
FIG. 10B is a bottom plan view of the communication module according to the fourth working example.

Next, referring to FIG. 10A and FIG. 10B, a communication module according to the fourth working example is described. Hereinafter, the description regarding the configuration common to the communication module according to the first working example (FIG. 1A to FIG. 2B) is omitted.

FIG. 10A and FIG. 10B are a cross-sectional view and a bottom plan view of the communication module according to the fourth working example, respectively. In the first working example, as illustrated in FIG. 1A, the baseband integrated circuit element 51 is mounted on the multilayer substrate 22, the radio frequency integrated circuit element 41 is mounted on another multilayer substrate 21, and these two layers of the multilayer substrates 21 and 22 are stacked on top of each other in the thickness direction. Whereas, in the fourth working example, the baseband integrated circuit element 51 and the radio frequency integrated circuit element 41 are mounted on the bottom surface of a common multilayer substrate 26. Furthermore, the radio frequency circuit components 42, 43 and the like are mounted on the bottom surface of the multilayer substrate 26. The multilayer substrate 23 is stacked on the top surface of the multilayer substrate 26, and a plurality of radiating elements 30 are arranged on the top surface of the multilayer substrate 23.

The baseband ground plane 33, the radio frequency ground plane 31, a plurality of feed lines 38A, and a plurality of wiring lines 38B are arranged inside the multilayer substrate 26. A plurality of feed lines 37 are arranged inside the multilayer substrate 23. The radio frequency integrated circuit element 41 is connected to the radiating elements 30 via the feed lines 38A and 37. The radio frequency integrated circuit element 41 and the baseband integrated circuit element 51 are connected via the wiring lines 38B. The wiring lines 38B transmit control signals and low frequency signals (for example, intermediate frequency signals) between the baseband integrated circuit element 51 and the radio frequency integrated circuit element 41.

The baseband ground plane 33 and the radio frequency ground plane 31 are connected by the first inter-ground connection circuit 45. Furthermore, the baseband ground plane 33 and the radio frequency ground plane 31 are connected by the second inter-ground connection circuit 46 at their edges. For example, for the first inter-ground connection circuit 45 and the second inter-ground connection circuit 46, a via conductor buried in a through via hole can be used.

The baseband integrated circuit element 51, the radio frequency integrated circuit element 41, the radio frequency circuit components 42 and 43, and the like, which are mounted on the bottom surface of the multilayer substrate 26, are sealed by a sealing resin layer 27. A plurality of conductor posts 52 is buried in the sealing resin layer 27. The plurality of conductor posts 52 each extend from the bottom surface of the multilayer substrate 26 and reach the bottom surface of the sealing resin layer 27.

The bottom side ground plane 53 is placed on the bottom surface of the sealing resin layer 27. The bottom side ground plane 53 is connected to the baseband ground plane 33 via some of the conductor posts 52. The bottom side ground plane 53 functions as an electromagnetic shielding layer. In each of locations where the other conductor posts 52 are placed, an opening 55 is formed in the bottom side ground plane 53 to ensure the insulation between the conductor post 52 and the bottom side ground plane 53. The conductor film 54 composed of the same material as the bottom side ground plane 53 is placed on the downward end face of each conductor post 52. The conductor film 54 is used as a signal terminal, a power supply terminal, or the like for connecting with an external board such as a motherboard or the like.

Next, advantageous effects of the fourth working example are described. Configurations of the baseband ground plane 33, the radio frequency ground plane 31, the first inter-ground connection circuit 45, and the second inter-ground connection circuit 46 of the communication module according to the fourth working example are the same as those of the communication module according to the first working example. Accordingly, as is the case with the first working example, spurious emissions can be suppressed.

Figure 11A:
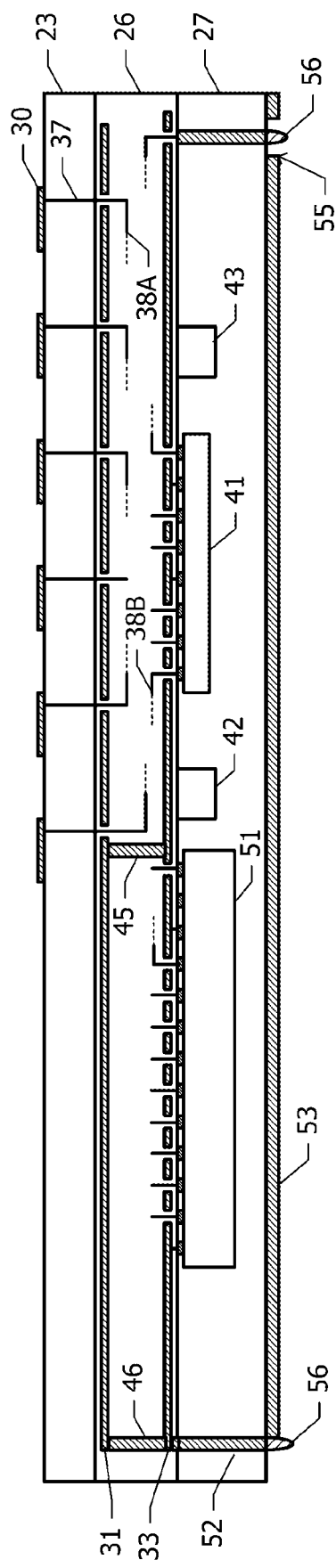
FIG. 11A is a cross-sectional view of a communication module according to a first modification example of the fourth working example.
Figure 11B:
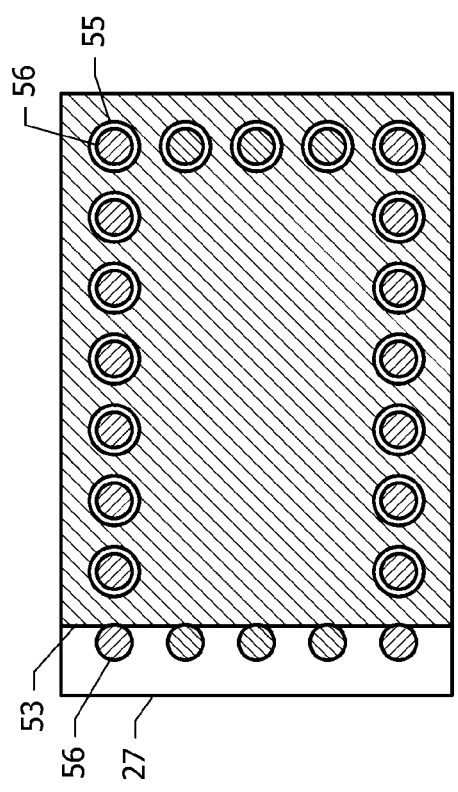
FIG. 11B is a bottom plan view of the communication module according to the first modification example of the fourth working example.

Next, referring to FIG. 11A and FIG. 11B, a communication module according to a first modification example of the fourth working example is described.

FIG. 11A and FIG. 11B are a cross-sectional view and a bottom plan view of a communication module according to the first modification example of the fourth working example, respectively. In the fourth working example, the conductor film 54 that covers the downward end face of the conductor post 52 (FIG. 10A and FIG. 10B) is used as a signal terminal, a power supply terminal, or the like for external connection. Whereas, in the first modification example of the fourth working example, a solder ball 56 is mounted on the downward end face of the conductor post 52. This communication module is surface-mounted on a motherboard or the like using the solder balls 56.

Figure 12A:
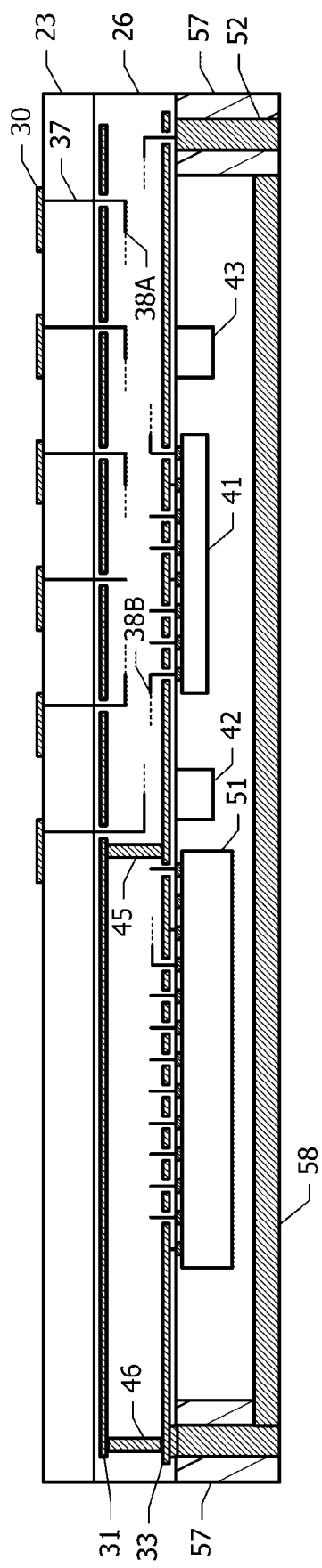
FIG. 12A is a cross-sectional view of a communication module according to a second modification example of the fourth working example.
Figure 12B:
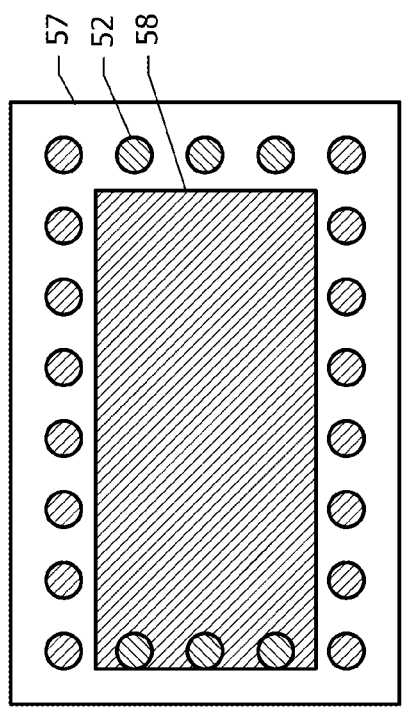
FIG. 12B is a bottom plan view of the communication module according to the second modification example of the fourth working example.

Next, referring to FIG. 12A and FIG. 12B, a communication module according to a second modification example of the fourth working example is described.

FIG. 12A and FIG. 12B are a cross-sectional view and a bottom plan view of the communication module according to the second modification example of the fourth working example, respectively. In the fourth working example, the baseband integrated circuit element 51, the radio frequency integrated circuit element 41, and the like are sealed by the sealing resin layer 27 (FIG. 10A and FIG. 10B). Whereas, in the second modification example of the fourth working example, an insulating support frame 57 is placed along an outer perimeter of the bottom surface of the multilayer substrate 26. In the plan view, the baseband integrated circuit element 51, the radio frequency integrated circuit element 41, and the like are surrounded by support frame 57. A plurality of conductor posts 52 is buried inside the support frame 57. An opening of the support frame 57 is closed by a metal plate 58. The support frame 57 and the metal plate 58 ensure the airtightness of the space in which the baseband integrated circuit element 51, the radio frequency integrated circuit element 41, and the like are arranged.

The metal plate 58 is connected to the baseband ground plane 33 via some of the conductor posts 52. The downward end face of the conductor post 52 is exposed and used as a signal terminal, a power supply terminal, or the like for connecting with an external board.

Even in the first modification example and the second modification example of the fourth working example, as is the case with the fourth working example, spurious emissions can be suppressed.

Fifth Working Example

Figure 13A:
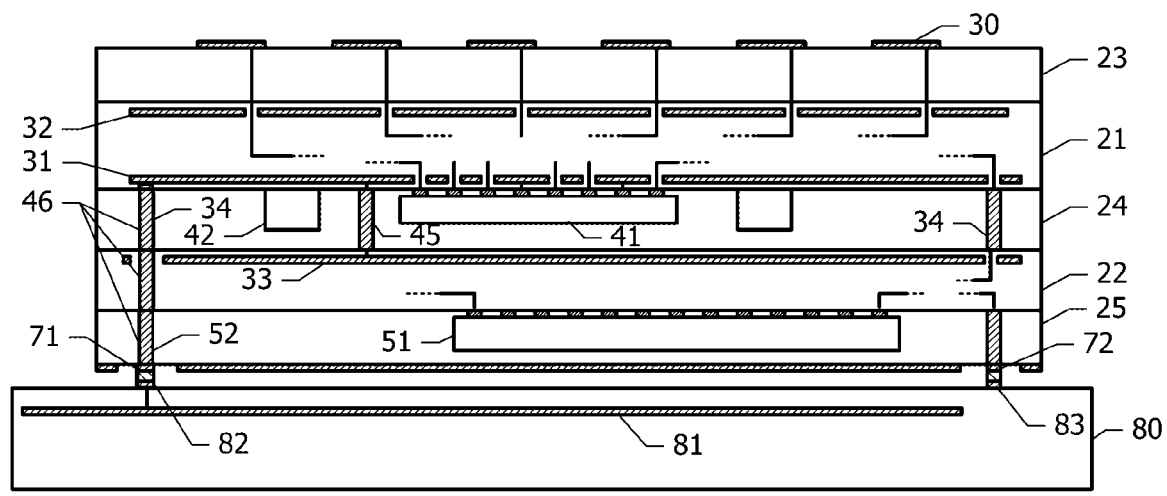
FIG. 13A is a cross-sectional view illustrating a state where a communication module according to a fifth working example is mounted on a motherboard.
Figure 13B:
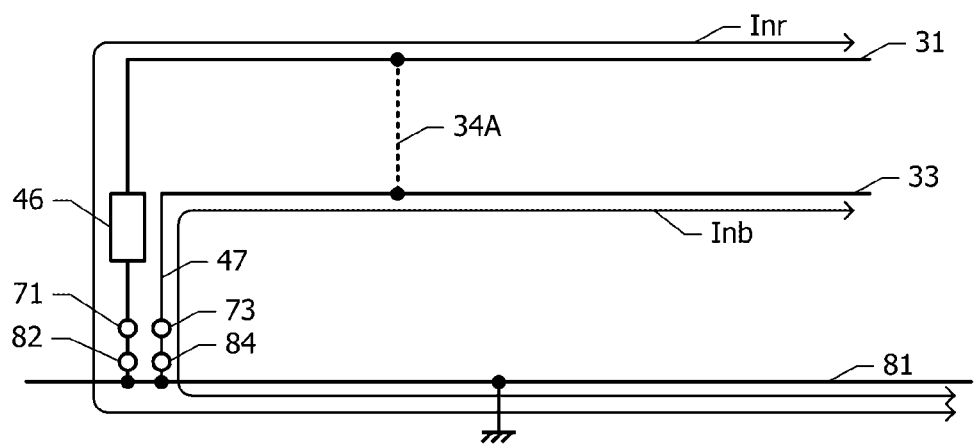
FIG. 13B is a diagram schematically illustrating a connection configuration of a baseband ground plane and a radio frequency ground plane of the communication module according to the fifth working example and a ground plane of the motherboard.

Next, referring to FIG. 13A and FIG. 13B, a communication module according to the fifth working example is described. Hereinafter, the description regarding the configuration common to the communication module according to the first working example (FIG. 1A to FIG. 2B) is omitted.

FIG. 13A is a cross-sectional view illustrating a state where the communication module according to the fifth working example is mounted on a motherboard. In the first working example, the baseband ground plane 33 and the radio frequency ground plane 31 are connected via the first inter-ground connection circuit 45 and are also connected via the second inter-ground connection circuit 46 at their edges. Whereas, in the fifth working example, the second inter-ground connection circuit 46 is not connected to the baseband ground plane 33.

A radio frequency ground terminal 71 and a plurality of other terminals 72 are arranged on the bottom surface of the sealing resin layer 25. The second inter-ground connection circuit 46 extends from the radio frequency ground plane 31 in the thickness direction through the sealing resin layer 24, the multilayer substrate 22, and the sealing resin layer 25, and reaches the radio frequency ground terminal 71. The second inter-ground connection circuit 46 includes one conductor post 34 inside the sealing resin layer 24, a via conductor inside the multilayer substrate 22, and one conductor post 52 inside the sealing resin layer 25. The via conductor inside the multilayer substrate 22, which constitutes the second inter-ground connection circuit 46, passes through an opening formed in the baseband ground plane 33 and is not connected to the baseband ground plane 33.

Lands 82 and 83 are arranged on the top surface of a motherboard 80, which is an external board for mounting the communication module, and a ground plane 81 is placed on an internal layer of the motherboard 80. The land 82 is connected to the ground plane 81. The radio frequency ground terminal 71 and another terminal 72 are connected to the lands 82 and 83 by soldering, respectively. The connecting part of the second inter-ground connection circuit 46 to the radio frequency ground plane 31 is similar to the cases of the first working example (FIG. 2A) and the modification examples thereof (FIG. 7A, FIG. 7B, and FIG. 7C).

FIG. 13B is a diagram schematically illustrating a connection configuration of the baseband ground plane 33 and the radio frequency ground plane 31 of the communication module according to the fifth working example and the ground plane 81 of the motherboard 80. The radio frequency ground plane 31 is connected to the ground plane 81 of the motherboard 80 via the second inter-ground connection circuit 46, the radio frequency ground terminal 71, the land 82, and the like.

Although it is not illustrated in the cross-sectional view of FIG. 13A, a baseband ground terminal 73 is provided on the bottom surface of the sealing resin layer 25 (FIG. 13A). A third inter-ground connection circuit 47 extends from the baseband ground plane 33 to the baseband ground terminal 73. A land 84 is placed on the top surface of the motherboard 80 (FIG. 13A). The land 84 is connected to the ground plane 81. The baseband ground plane 33 is connected to the ground plane 81 via the third inter-ground connection circuit 47, the baseband ground terminal 73, the land 84, and the like.

In the first working example, as illustrated in FIG. 2B, the noise current Inb flows only within the baseband ground plane 33, and the noise current Inr flows only within the radio frequency ground plane 31. Whereas, in the fifth working example, the noise current Inb flows across the baseband ground plane 33 and the ground plane 81 of the motherboard 80. Furthermore, the noise current Inr flows across the radio frequency ground plane 31 and the ground plane 81 of the motherboard 80. The location and the impedance of the second inter-ground connection circuit 46 are adjusted in such a way that the spurious emission caused by the noise current Inb and the spurious emission caused by the noise current Inr weaken each other.

Next, advantageous effects of the fifth working example are described. The fifth working example enables to suppress the spurious emissions caused by the noise currents flowing across the ground plane inside the communication module and the ground plane 81 inside the motherboard 80.

Needless to say, each working example is for illustrative purposes only, and constituting elements illustrated in different working examples may be combined or partially exchanged. Similar actions and effects produced by similar constituting elements of a plurality of working examples will not be repeated in every working example. Furthermore, the present disclosure is not limited to the working examples described above. For example, it would be obvious to a person skilled in the art that various changes, improvements, combinations, or the like can be made.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A communication module comprising:
   a baseband integrated circuit that performs processing of a baseband signal;
   a radio frequency integrated circuit that performs processing of a radio frequency signal based on a control signal and a low frequency signal supplied from the baseband integrated circuit;
   a radiating element;
   a feed line that connects the radio frequency integrated circuit and the radiating element;
   a baseband ground plane connected to a ground terminal of the baseband integrated circuit;
   a radio frequency ground plane arranged to overlap the baseband ground plane, the radio frequency ground plane serving as a return path of the feed line;
   a first inter-ground connection circuit that connects the baseband ground plane and the radio frequency ground plane; and
   at least one second inter-ground connection circuit that connects the baseband ground plane and the radio frequency ground plane, wherein
   a first connecting part between the baseband ground plane and the second inter-ground connection circuit and a second connecting part between the radio frequency ground plane and the second inter-ground connection circuit are arranged closer to respective edges of the baseband ground plane and the radio frequency ground plane than a third connecting part between the baseband ground plane and the first inter-ground connection circuit and a fourth connecting part between the radio frequency ground plane and the first inter-ground connection circuit, and
   the first connecting part and the second connecting part are arranged on a first side of a first imaginary straight line that passes a geometric center of the baseband ground plane and a second side of a second certain imaginary straight line that passes a geometric center of the radio frequency ground plane, respectively.

2. The communication module according to claim 1, wherein
   an impedance of the second inter-ground connection circuit is higher than an impedance of the first inter-ground connection circuit.

3. The communication module according to claim 1, wherein
   the second inter-ground connection circuit includes an inter-layer portion and an intra-layer portion,
   the inter-layer portion extends in a thickness direction that separates the baseband ground plane and the radio frequency ground plane, and
   the intra-layer portion is:
      placed at a same position as at least one of the baseband ground plane or the radio frequency ground plane in the thickness direction,
      connects the inter-layer portion and at least one of the baseband ground plane or the radio frequency ground plane, and
      has at least one of a capacitance component or an inductance component.

4. The communication module according to claim 2, wherein
   the second inter-ground connection circuit includes an inter-layer portion and an intra-layer portion,
   the inter-layer portion extends in a thickness direction that separates the baseband ground plane and the radio frequency ground plane, and
   the intra-layer portion is:
      placed at a same position as at least one of the baseband ground plane or the radio frequency ground plane in the thickness direction,
      connects the inter-layer portion and at least one of the baseband ground plane or the radio frequency ground plane, and
      has at least one of a capacitance component or an inductance component.

5. The communication module according to claim 1, wherein the first inter-ground connection circuit connects inner parts of the baseband ground plane and the radio frequency ground plane.

6. The communication module according to claim 1, wherein the second inter-ground connection circuit connects the baseband ground plane and the radio frequency ground plane at their respective edges.

7. The communication module according to claim 1, wherein a first shortest distance from the second inter-ground connection circuit to a first edge of radio frequency ground plane is shorter than a second shortest distance from the first inter-ground connection circuit to a second edge of the radio frequency ground plane.

8. The communication module according to claim 1, wherein the second inter-ground connection circuit comprises at least one conductor post.

9. The communication module according to claim 8, wherein the first shortest distance from the second inter-ground connection circuit to the first edge of radio frequency ground plane is 2.5 times a diameter of the conductor post of the second inter-ground connection circuit or lower.

10. The communication module according to claim 1, wherein a plurality of second inter-ground connection circuits are arranged along an edge corresponding to a short side of the radio frequency ground plane.

11. The communication module according to claim 1, wherein a plurality of second inter-ground connection circuits are arranged along two mutually adjacent edges of the radio frequency ground plane at substantially equal intervals.

12. The communication module according to claim 1, wherein the baseband integrated circuit and the radio frequency integrated circuit are arranged on different multilayer substrates stacked on top of each other in a thickness direction.

13. The communication module according to claim 1, wherein the baseband integrated circuit and the radio frequency integrated circuit are arranged on a bottom surface of a common multilayer substrate.

14. The communication module according to claim 1, wherein the radiating element is arranged above the feed line.

15. A communication module comprising:
    a baseband integrated circuit that performs processing of a baseband signal;
    a radio frequency integrated circuit that performs processing of a radio frequency signal based on a control signal and a low frequency signal supplied from the baseband integrated circuit;
    a radiating element;
    a feed line that connects the radio frequency integrated circuit and the radiating element;
    a baseband ground plane connected to a ground terminal of the baseband integrated circuit;
    a radio frequency ground plane arranged to overlap the baseband ground plane, the radio frequency ground plane serving as a return path of the feed line;
    a first inter-ground connection circuit that connects the baseband ground plane and the radio frequency ground plane;
    a baseband ground terminal that connects the baseband ground plane to a land of an external board;
    a radio frequency ground terminal; and
    a second inter-ground connection circuit that connects the radio frequency ground plane and the radio frequency ground terminal, wherein
    a first connecting part between the radio frequency ground plane and the second inter-ground connection circuit is placed closer to an edge of the radio frequency ground plane than a second connecting part between the radio frequency ground plane and the first inter-ground connection circuit, and
    the first connecting part is placed on one side of an imaginary straight line that passes a geometric center of the radio frequency ground plane.

16. The communication module according to claim 15, wherein the second inter-ground connection circuit comprises at least one conductor post.

17. The communication module according to claim 16, wherein the second inter-ground connection circuit comprises a first conductor post inside a first sealing resin layer, a via conductor inside a multilayer substrate, and a second conductor post inside a second sealing resin layer.

18. The communication module according to claim 17, wherein the via conductor is not connected to the baseband ground plane.

19. The communication module according to claim 17, wherein the via conductor passes through an opening formed in the baseband ground plane.

20. The communication module according to claim 15, wherein the first inter-ground connection circuit connects inner parts of the baseband ground plane and the radio frequency ground plane.

21. The communication module according to claim 15, wherein an impedance of the second inter-ground connection circuit is higher than an impedance of the first inter-ground connection circuit.

22. The communication module according to claim 15, wherein the radiating element is arranged above the feed line.

* * * * *